United States Patent
Zhai (10) Patent No.: US 12,460,060 B2
(45) Date of Patent: Nov. 4, 2025

(54) THERMOPLASTIC ELASTOMER (TPE) PHYSICALLY-FOAMED ROLL AND SEMI-CONTINUOUS PREPARATION METHOD THEREOF

(71) Applicant: SUN YAT-SEN UNIVERSITY, Guangdong (CN)

(72) Inventor: Wentao Zhai, Guangdong (CN)

(73) Assignee: SUN YAT-SEN UNIVERSITY, Guangzhou (CN)

( * ) Notice: Subject to any disclaimer, the term of this patent is extended or adjusted under 35 U.S.C. 154(b) by 260 days.

(21) Appl. No.: 18/204,387

(22) Filed: May 31, 2023

(65) Prior Publication Data
US 2023/0323065 A1    Oct. 12, 2023

Related U.S. Application Data

(63) Continuation of application No. PCT/CN2022/077102, filed on Feb. 21, 2022.

(30) Foreign Application Priority Data

Jun. 1, 2021   (CN) .......................... 202110611194.9

(51) Int. Cl.
| | |
|---|---|
| *B29C 44/04* | (2006.01) |
| *B29C 44/34* | (2006.01) |

(Continued)

(52) U.S. Cl.
CPC ........... *C08J 9/122* (2013.01); *B29C 44/0484* (2013.01); *B29C 44/3415* (2013.01);
(Continued)

(58) Field of Classification Search
None
See application file for complete search history.

(56) References Cited

U.S. PATENT DOCUMENTS

| | | | | |
|---|---|---|---|---|
| 2,216,136 | A * | 10/1940 | Roberts | ............... B29C 44/3419 |
| | | | | 264/50 |
| 2,231,950 | A * | 2/1941 | Roberts | .................... C08J 9/122 |
| | | | | 521/94 |

(Continued)

FOREIGN PATENT DOCUMENTS

| | | | |
|---|---|---|---|
| CN | 103951965 B | 4/2015 | |
| CN | 105885394 A * | 8/2016 | ................ C08J 5/18 |

(Continued)

OTHER PUBLICATIONS

Machine Translation of JP2002144497A, May 2002 (Year: 2002).*

(Continued)

*Primary Examiner* — Jeffrey A Vonch (57) ABSTRACT

Provided are a thermoplastic elastomer (TPE) physically-foamed roll and a semi-continuous preparation method thereof. In the preparation method, the desorption of a high-pressure fluid is inhibited by controlling a solubility of the high-pressure fluid in a TPE roll and then subjecting the material to a quick freezing and gas-locking treatment at a specific temperature, and an impregnated roll can be stored at a low temperature for a long time or subjected to long-distance transportation, and can be stably subjected to continuous heating and foaming, which allows large-scale continuous production and is safe and environmentally-friendly. The present disclosure also provides a TPE physically-foamed roll prepared by the preparation method, and the TPE physically-foamed roll has a thickness of 0.1 mm to 3 mm, a density of 0.1 g/cm$^3$ to 0.6 g/cm$^3$, a foam cell size of 1 μm to 200 μm, and a Shore hardness of 20 C to 60 C.

6 Claims, 1 Drawing Sheet

(51) Int. Cl.
  *C08J 7/048* (2020.01)
  *C08J 9/00* (2006.01)
  *C08J 9/12* (2006.01)
  *B29C 44/02* (2006.01)
  *B29K 21/00* (2006.01)
  *C08J 7/04* (2020.01)

(52) U.S. Cl.
  CPC ...... *B29C 44/3419* (2013.01); *B29C 44/3453* (2013.01); *B29C 44/348* (2013.01); *C08J 7/048* (2020.01); *C08J 9/0023* (2013.01); *C08J 9/0061* (2013.01); *C08J 9/0066* (2013.01); *B29C 44/022* (2013.01); *B29C 44/0461* (2013.01); *B29K 2021/003* (2013.01); *C08J 7/0427* (2020.01); *C08J 2201/032* (2013.01); *C08J 2201/034* (2013.01); *C08J 2201/036* (2013.01); *C08J 2203/06* (2013.01); *C08J 2203/08* (2013.01); *C08J 2205/044* (2013.01); *C08J 2205/052* (2013.01); *C08J 2300/22* (2013.01); *C08J 2300/26* (2013.01); *C08J 2367/00* (2013.01); *C08J 2375/04* (2013.01); *C08J 2377/00* (2013.01); *C08J 2429/04* (2013.01); *Y10T 428/249976* (2015.04); *Y10T 428/249977* (2015.04); *Y10T 428/249978* (2015.04); *Y10T 428/249979* (2015.04); *Y10T 428/249987* (2015.04); *Y10T 428/249991* (2015.04); *Y10T 428/249993* (2015.04)

(56) References Cited

U.S. PATENT DOCUMENTS

| | | | | |
|---|---|---|---|---|
| 5,158,986 A | * | 10/1992 | Cha | B29C 44/3446 521/97 |
| 5,574,096 A | * | 11/1996 | Tanaka | C08L 29/04 525/221 |
| 5,684,055 A | * | 11/1997 | Kumar | C08J 9/34 264/DIG. 83 |
| 6,461,725 B1 | * | 10/2002 | Kanada | B29C 44/3446 428/317.1 |
| 2002/0168509 A1 | * | 11/2002 | DeSimone | B32B 27/08 428/318.6 |
| 2002/0193459 A1 | * | 12/2002 | Haseyama | B29C 44/348 521/155 |
| 2007/0135528 A1 | * | 6/2007 | Butler | C08J 9/28 521/61 |
| 2010/0112301 A1 | * | 5/2010 | Powers | B32B 37/00 156/60 |
| 2012/0065287 A1 | * | 3/2012 | Nadella | C08J 9/00 521/149 |
| 2012/0228793 A1 | * | 9/2012 | Lindenfelzer | B29C 48/10 264/50 |
| 2013/0303645 A1 | * | 11/2013 | Dix | B29C 44/468 521/182 |
| 2015/0045464 A1 | * | 2/2015 | Okumura | B29C 48/0018 264/53 |
| 2015/0119482 A1 | * | 4/2015 | Kumar | C08J 5/18 521/97 |
| 2020/0002498 A1 | * | 1/2020 | Luo | B29C 44/3415 |
| 2021/0076772 A1 | * | 3/2021 | Baghdadi | B29D 35/081 |
| 2022/0111570 A1 | * | 4/2022 | Waggoner | B29C 44/24 |
| 2022/0185981 A1 | * | 6/2022 | Zhang | C08J 9/36 |
| 2022/0212377 A1 | * | 7/2022 | Chang | B29C 44/3453 |
| 2022/0267554 A1 | * | 8/2022 | Chang | B32B 38/00 |
| 2022/0267555 A1 | * | 8/2022 | Chang | B32B 27/306 |
| 2022/0267556 A1 | * | 8/2022 | Chang | A43B 13/187 |
| 2022/0274297 A1 | * | 9/2022 | Chang | B29C 44/355 |
| 2023/0082467 A1 | * | 3/2023 | Chang | C08J 9/122 428/51 |
| 2023/0091558 A1 | * | 3/2023 | Chang | B29D 35/126 |

FOREIGN PATENT DOCUMENTS

| | | | | |
|---|---|---|---|---|
| CN | 104611942 B | | 1/2017 | |
| CN | 106496628 A | * | 3/2017 | |
| CN | 108285634 A | | 7/2018 | |
| CN | 108690363 A | * | 10/2018 | C08J 9/122 |
| CN | 105714574 B | | 3/2019 | |
| CN | 110615911 A | * | 12/2019 | C08J 9/122 |
| CN | 108479431 B | | 1/2020 | |
| CN | 111484725 A | | 8/2020 | |
| CN | 112476929 A | * | 3/2021 | B29C 44/60 |
| CN | 113444363 A | * | 9/2021 | C08J 9/12 |
| CN | 114456433 A | * | 5/2022 | C08J 9/0061 |
| JP | 2002144497 A | * | 5/2002 | |
| JP | 2017222784 A | * | 12/2017 | C08J 9/122 |
| KR | 20040016454 A | * | 2/2004 | |
| WO | WO-9947573 A1 | * | 9/1999 | C08L 23/10 |
| WO | WO-2017030835 A1 | * | 2/2017 | C08J 9/122 |

OTHER PUBLICATIONS

Machine Translation of CN106496628A, Mar. 2017 (Year: 2017).*
Machine Translation of JP2017222784A, Dec. 2017 (Year: 2017).*
Goff et al., The Dynisco Extrusion Processors Handbook, Jan. 2000 (Year: 2001).*

* cited by examiner

THERMOPLASTIC ELASTOMER (TPE) PHYSICALLY-FOAMED ROLL AND SEMI-CONTINUOUS PREPARATION METHOD THEREOF

CROSS-REFERENCE TO RELATED APPLICATIONS

The present application is a continuation application of PCT application No. PCT/CN2022/077102 filed on Feb. 21, 2022, which claims the benefit of Chinese Patent Application No. 202110611194.9 filed on Jun. 1, 2021. The contents of all of the aforementioned applications are incorporated by reference herein in their entirety.

TECHNICAL FIELD

The present disclosure relates to the field of thermoplastic elastomer (TPE) foamed leathers, and specifically relates to a TPE physically-foamed roll and a semi-continuous preparation method thereof.

BACKGROUND

Generally, the processing of polymer foamed leather (such as polyvinyl chloride (PVC) leather and polyurethane (PU) leather) involves the use and emission of a large number of chlorides, sulfides, solvents, and plasticizers, and corresponding products have the problem of volatile organic compound (VOC) release, which limits the application of polymer foamed leather in fields such as automotive sofa leather and interior leather.

TPEs such as thermoplastic polyurethane (TPU), thermoplastic polyester elastomer (TPEE), and thermoplastic polyamide elastomer (TPAE) are a class of materials that are more environmentally-friendly than traditional polymers, and TPEs have excellent wear resistance, scratch resistance, mechanical strength, air permeability, water and oil resistance, and bacterial resistance and can be recovered through melting. Typically, TPU foamed films prepared from TPU resins are a group of artificial leather materials with promising application prospects.

CN111484725A and CN108285634A each disclose a TPU foamed leather and a preparation method thereof. In the preparation solutions of the above patents, an azodicarbonamide (AC) foaming agent, a microsphere foaming agent, or a composite of the above foaming agents is used as an additive, and a TPU foamed film is prepared through an extrusion-calendering process. However, the AC foaming agent and the microsphere foaming agent cannot be completely decomposed during processing, which is easy to cause an environmental problem; and the use of a chemical foaming agent to prepare a TPU foamed leather also has problems such as large foam cell size and low foaming expansion rate of a product.

CN105714574B discloses a method for preparing a TPU artificial leather through continuous extrusion-foaming with a supercritical fluid (SCF), where a TPU resin is continuously melted in a first extruder, the SCF such as a $CO_2$ fluid is injected through a tail end of the first extruder, a polymer/fluid mixture is injected into a second extruder through a melt pump, and a TPU foamed film is prepared through casting at a die of the second extruder. However, in the above solution, a high-pressure fluid diffuses too fast in a high-temperature extrusion die, and thus is easy to escape from a polymer melt. When a thickness of an extruded film decreases, an escape degree of a high-pressure fluid is significantly increased, and thus this method can hardly lead to a TPU foamed film with a thickness of less than 1 mm and a uniform foam cell size distribution. In addition, the rapid escape of a high-pressure fluid also leads to surface defects such as air marks and chatter marks on a surface of a foamed film.

In order to prepare a TPU foamed leather with a small thickness, such as a product with a thickness of 0.3 mm to 2.0 mm, CN104611942B discloses a method for preparing a foamed leather through continuous extrusion-foaming with a supercritical $N_2$ fluid. Although this method can lead to a low-thickness product, due to a low solubility of $N_2$ in TPU during preparation, the prepared TPU foamed leather has a large density generally of 0.4 $g/cm^3$ to 0.8 $g/cm^3$. In addition, a high-pressure fluid is still easy to escape at a high temperature during a continuous extrusion-foaming process, resulting in defects such as air marks and chatter marks on a surface of a foamed film product.

It has been discovered through exploration that kettle pressure foaming can be used to prepare a TPU foamed film with a smooth surface, a small foam cell size, a uniform foam cell structure distribution, and a low density. CN103951965B discloses a preparation method of a TPU foamed sheet, where a colored TPU sheet is impregnated with a high-pressure fluid, and then heated and foamed in a water bath to finally obtain a colored TPU foamed sheet. However, the high-pressure fluid will still diffuse and escape from an impregnated TPU sheet at normal temperature and pressure, such that the TPU sheet impregnated with the high-pressure fluid cannot be foamed after being placed at normal temperature and pressure for a period of time. Therefore, it is difficult to stably and continuously prepare a TPU foamed roll by this method. In addition, it is well known in the industry that, when a thickness of a TPU film is less than 0.1 mm, a high-pressure fluid will quickly escape from an impregnated TPU film, such that it is difficult to achieve the heating and foaming of the impregnated TPU film.

In order to solve the above problems, CN108479431B discloses a method for compounding two gas blocking film layers and a TPU film into a sandwich structure. Because a gas blocking film can prevent the escape of a high-pressure fluid from an impregnated TPU film, a TPU film with a thickness of less than 0.1 mm can be prepared. However, it has been reported in the existing literature that an interfacial adhesive strength between a blocking film and a TPU film will affect a foaming behavior of TPU, resulting in different expansion behaviors and foam cell morphologies. Therefore, the method of improving the foaming of a TPU film with a gas blocking film faces problems during a large-scale implementation process. Blocking films are expensive, and thus the use of such raw materials will increase a product processing cost. In addition, a TPU film impregnated with a high-pressure fluid (a foaming agent) is prone to desorption after being placed at normal temperature and pressure for a long time, and the escape of a large amount of the foaming agent makes a TPU foaming process unstable, which also limits the large-scale preparation of TPU foamed film rolls.

SUMMARY

In view of the defects in the prior art, an objective of the present disclosure is to provide a semi-continuous preparation method of a TPE physically-foamed roll. In the preparation method, a TPE roll is impregnated with a high-pressure fluid, and then subjected to a quick freezing and gas-locking treatment, which does not significantly reduce a weight of an impregnated roll during foaming, significantly reduces an escape rate of the high-pressure fluid in the roll, and can realize the long-distance transportation and continuous heating and foaming of the roll. The preparation method can realize large-scale continuous production, is safe and environmentally-friendly, and can lead to a product with a smooth surface, a small thickness, a low density, and small and uniform foam cells.

In order to achieve the above objective, the present disclosure adopts the following technical solutions:

A semi-continuous preparation method of a TPE physically-foamed roll is provided, including the following steps:
(1) drying a TPE and additives separately, premixing dried materials, and subjecting a resulting mixture to continuous extrusion with a twin-screw extruder, calendering, and winding to obtain a precursor TPE roll;
(2) placing the precursor TPE roll obtained in step (1) in a high-pressure fluid for impregnation to obtain an impregnated TPE roll, and subjecting the impregnated TPE roll to a quick freezing and gas-locking treatment and low-temperature storage, where a mass content of the high-pressure fluid in the impregnated TPE roll is 1% to 15%; the quick freezing and gas-locking treatment is conducted at −20° C. to −100° C.; and the low-temperature storage is conducted at −60° C. to −20° C.; and
(3) heating an impregnated TPE roll obtained after the low-temperature storage in a heating medium for physical foaming, and rolling, cooling, and winding a foamed material to obtain the TPE physically-foamed roll, where the heating medium is hot air or hot water.

After the TPE roll impregnated with the high-pressure fluid is subjected to the quick freezing and gas-locking treatment, the movement of molecular chains of the elastomer polyester is frozen, and thus the movement of high-pressure fluid molecules is confined to a maximum, such that the impregnated TPE roll can be stored or transported for a long time at a specific low temperature, and a desorption rate of high-pressure fluid molecules is significantly reduced during storage and subsequent foaming, which is conducive to maintaining a weight loss rate of the TPE roll.

Through multiple rounds of experimental screening, the inventors have found that, when the impregnated TPE roll is subjected to a quick freezing and gas-locking treatment at −20° C. to −100° C., an optimal effect and a highest implementation feasibility can be achieved. When the temperature of the quick freezing and gas-locking treatment is lower than −100° C., a molecular confinement rate of the high-pressure fluid cannot be improved too much, there are high requirements for devices, and a cost is significantly increased; and when the temperature is higher than −20° C., a molecular movement probability of the high-pressure fluid is increased, and a preferred weight loss rate cannot be guaranteed.

In the semi-continuous preparation method of a TPE physically-foamed roll of the present disclosure, the desorption of the high-pressure fluid is inhibited by controlling a solubility of the high-pressure fluid in a TPE roll and then subjecting the material to a quick freezing and gas-locking treatment at a specific temperature, and an impregnated roll can be stored at a low temperature for a long time or subjected to long-distance transportation, can be stably subjected to continuous heating and foaming, and will not undergo obvious high-pressure fluid escape like the prior art either during storage or foaming, which significantly improves the implementability. The preparation method can realize large-scale continuous production, is safe and environmentally-friendly, and can lead to a product with a smooth surface, a small thickness, a low density, and small and uniform foam cells.

Preferably, in step (1), the TPE has a Shore hardness of 60 A to 95 A, and the precursor TPE roll has a thickness of 0.1 mm to 3 mm.

The raw material hardness and the precursor thickness can be optimized to guarantee the subsequent impregnation and foaming effects of the high-pressure fluid and the performance of a final product, which can avoid a too-high or too-low impregnation rate of the high-pressure fluid and a poor foaming effect caused by unsatisfactory thickness, or avoid poor mechanical performance of a product due to insufficient hardness.

Preferably, in step (1), the TPE includes at least one selected from the group consisting of TPU, TPEE, and TPAE; and the additives include a nucleating agent and an antioxidant.

More preferably, in step (1), the TPE is added in 100 parts by weight; the nucleating agent is added in 0 to 20 parts by weight; and the antioxidant is added in 0 to 1 part by weight.

The addition of the antioxidant and the nucleating agent at specific amounts can improve the stability of a resulting TPE, and can also optimize a crystallinity of a TPE roll impregnated with a high-pressure fluid, which can further inhibit a weight loss of the impregnated roll during storage and foaming.

Preferably, in step (1), among the 100 parts by weight of the TPE, the TPU accounts for 1 to 99 parts by weight; and more preferably, the TPU accounts for 5 to 30 parts by weight or 70 to 95 parts by weight.

The TPU, TPEE, and TPAE each have a glass transition temperature of about −30° C. to −50° C., and have similar properties such as hardness; and an addition ratio of the three can be adjusted according to an actual production to prepare a smoothly-foamed TPE roll with a high impregnation rate.

Preferably, the nucleating agent includes an organic nucleating agent and an inorganic nucleating agent; and the organic nucleating agent includes at least one selected from the group consisting of EVA (Ethylene Vinyl Acetate Copolymer), POE (Poly(ethylene-1-octene)), OBC (Olefin block copolymer), SBES (Styrene Ethylene Butadiene Styrene Block Polymer), and EPDM (Ethylene-Propylene-Diene Monomer), and the inorganic nucleating agent includes at least one selected from the group consisting of calcium carbonate, a talcum powder, mica, and a glass bead.

Preferably, in step (1), the additives further include 1 to 20 parts of a gas blocking agent.

A molecular diffusion movement frequency in TPEs is higher than that in general polyesters; and TPEs are more prone to a gas escape phenomenon during foaming than general foamed materials, resulting in a significant decrease in foaming efficiency. Thus, an appropriate gas blocking agent can be added to form a dense gas blocking layer in a TPE roll, which can effectively confine an impregnated high-pressure fluid and reduce a desorption rate of the high-pressure fluid.

More preferably, the gas blocking agent includes polyvinyl alcohol (PVA).

Preferably, in step (1), the precursor TPE roll further includes a gas blocking layer, and a preparation method of the precursor TPE roll includes: drying the TPE and the additives separately, premixing dried materials, and subjecting a resulting mixture to continuous extrusion with a twin-screw extruder and calendering; and coating a surface of a resulting elastomer with a PVA-containing aqueous solution, and drying and winding a resulting material to obtain the precursor TPE roll.

Similar to the above addition of the gas blocking agent, during the preparation, the precursor TPE roll is coated with the PVA-containing aqueous solution and then dried to form a PVA film, which can also inhibit the escape of the high-pressure fluid during storage and foaming. Since the preparation method of the present disclosure includes a quick freezing and gas-locking treatment, the PVA film can guarantee low desorption of the high-pressure fluid compared with the prior art, and the film has high compatibility with the TPE and will not cause obvious expansion and foam cell morphological differences. The coating and drying steps are simple and easy to implement, and will not increase a processing cost.

Preferably, the gas blocking layer has a thickness of 0.01 mm to 0.05 mm.

Preferably, a mass content of PVA in the PVA-containing aqueous solution is 5% to 30%; and more preferably, the mass content of the PVA in the PVA-containing aqueous solution is 10% to 20%.

Preferably, in step (2), the high-pressure fluid includes at least one selected from the group consisting of a $CO_2$ fluid and a $N_2$ fluid.

More preferably, in step (2), the high-pressure fluid for the impregnation has a pressure of 1 MPa to 7 MPa, and the impregnation is conducted for 1 h to 24 h.

Preferably, in step (2), the mass content of the high-pressure fluid in the impregnated TPE roll obtained after the impregnation is 2% to 10%.

In the present disclosure, a content (%) of the high-pressure fluid in the TPE roll=$(m_1-m_0) \times 100\%/m_0$, where $m_0$ represents a mass of the precursor TPE roll, and $m_1$ represents a mass of a TPE roll that is impregnated with the high-pressure fluid and then subjected to desorption for 10 min at normal temperature and pressure. An impregnated content of the high-pressure fluid can be optimized to further control the crystallinity, density, and foaming efficiency of the subsequent product.

Preferably, in step (2), the quick freezing and gas-locking treatment is conducted with liquid nitrogen or carbon dioxide ice.

Liquid nitrogen has a boiling point of −196° C., and carbon dioxide ice has a boiling point of −57° C. Both liquid nitrogen and carbon dioxide ice are environmentally-friendly and inexpensive industrial refrigerants, and an instant freezing treatment of the impregnation high-pressure fluid with either of the two refrigerants has characteristics such as high efficiency and low implementation cost.

Preferably, in step (2), the quick freezing and gas-locking treatment is conducted at −50° C. to −80° C.

The TPE has undergone a glass transition phenomenon at −30° C. to −50° C. Therefore, when the temperature is maintained within the above preferred range, it is enough to inhibit the movement escape of the high-pressure fluid; and when the temperature continues to decrease, an inhibition effect cannot be further improved too much, and the production cost and difficulty will be increased.

Preferably, in step (3), a mass loss of the impregnated TPE roll after the low-temperature storage is 0% to 50%/d;

more preferably, the mass loss of the impregnated TPE roll after the low-temperature storage is 5% to 30%/d;

more preferably, the mass loss of the impregnated TPE roll after the low-temperature storage is 5% to 20%/d; and more preferably, the mass loss of the impregnated TPE roll after the low-temperature storage is 5% to 10%/d.

In the present disclosure, after the quick freezing and gas-locking treatment is conducted, the high-pressure fluid is confined in the TPE roll, and a weight loss rate is significantly reduced. Under specified conditions, a weight loss rate of the impregnated TPE roll can reach at least 5% to 10%/d.

A mass loss rate (%) of the impregnated TPE roll after the low-temperature storage=$(m_1-m_2) \times 100\%/(m_1-m_0)$, where $m_0$ represents a mass of the precursor TPE roll, $m_1$ represents a mass of a TPE roll that is impregnated with the high-pressure fluid and then subjected to desorption for 10 min at normal temperature and pressure, and $m_2$ represents a mass of an impregnated TPE roll that is subjected to a quick freezing and gas-locking treatment and low-temperature storage and then subjected to desorption for 10 min at normal temperature and pressure.

Another objective of the present disclosure is to provide a TPE physically-foamed roll prepared by the semi-continuous preparation method of a TPE physically-foamed roll described above, where in preparation of the TPE physically-foamed roll, a quick freezing and gas-locking treatment and a low-temperature storage treatment are conducted before foaming; and the TPE physically-foamed roll has a thickness of 0.1 mm to 3 mm, a density of 0.1 $g/cm^3$ to 0.6 $g/cm^3$, a foam cell size of 1 μm to 200 μm, and a Shore hardness of 20 C to 60 C.

Compared with a product obtained in the prior art, the polyester foamed roll product provided by the present disclosure has a small thickness (which can be less than 0.1 mm) and a low density because the escape of the high-pressure fluid is inhibited by a special treatment; and a foaming process in the present disclosure is smooth and uniform, and a foamed product has a smooth surface, a high quality, and excellent mechanical performance.

Preferably, the TPE physically-foamed roll has a thickness of 0.5 mm to 2 mm.

More preferably, the TPE physically-foamed roll includes a non-foamed skin layer and a foamed core layer inside, and the foamed core layer has a foam cell size of 10 μm to 50 μm.

Preferably, the TPE physically-foamed roll has a length of 50 μm or more.

Due to the continuous smooth foaming, a resulting product can retain a full ideal length and is suitable for a wide range of applications.

The present disclosure has the following beneficial effects: The present disclosure provides a semi-continuous preparation method of a TPE physically-foamed roll. In the semi-continuous preparation method, the desorption of the high-pressure fluid is inhibited by controlling a solubility of the high-pressure fluid in a TPE roll and then subjecting the material to a quick freezing and gas-locking treatment at a specific temperature, and an impregnated roll can be stored at a low temperature for a long time or subjected to long-distance transportation, can be stably subjected to continuous heating and foaming, and will not undergo obvious high-pressure fluid escape like the prior art either during storage or foaming, which significantly improves the implementability. The preparation method can realize large-scale continuous production, and is safe and environmentally-friendly. The present disclosure also provides a TPE physically-foamed roll prepared by the preparation method, and the TPE physically-foamed roll has a thickness of 0.1 mm to 3 mm, a density of 0.1 $g/cm^3$ to 0.6 $g/cm^3$, a foam cell size of 1 μm to 200 μm, and a Shore hardness of 20 C to 60 C.

DETAILED DESCRIPTION

In order to well illustrate the objectives, technical solutions, and advantages of the present disclosure, the present disclosure will be further described below in conjunction with specific examples and comparative examples, which is intended to comprehend the content of the present disclosure in detail, rather than to limit the present disclosure. All other examples obtained by those of ordinary skill in the art without creative efforts shall fall within the protection scope of the present disclosure. Unless otherwise specified, the experimental reagents and instruments designed for the implementation of the present disclosure are commonly-used reagents and instruments.

In each of examples and comparative examples, a content (%) of a high-pressure fluid in an impregnated polyester roll subjected to a quick freezing and gas-locking treatment and low-temperature storage=$(m_2-m_0) \times 100\%/m_0$, where $m_0$ represents a mass of a precursor TPE roll, and $m_2$ represents a mass of an impregnated TPE roll that is subjected to a quick freezing and gas-locking treatment and low-temperature storage and then subjected to desorption for 10 min at normal temperature and pressure.

Example 1

An example of the semi-continuous preparation method of a TPE physically-foamed roll of the present disclosure was provided, including the following steps:
(1) 100 parts of a TPU particle (Shore hardness: 80 A), 5 parts of a talcum powder, and 0.5 part of an antioxidant were dried separately, premixed, and then subjected to continuous extrusion with a twin-screw extruder, calendering, and winding to obtain a precursor TPE roll with a thickness of 1 mm.
(2) The precursor TPE roll obtained in step (1) was placed in a high-pressure vessel filled with a $CO_2$ fluid for impregnation to obtain an impregnated TPE roll with a high-pressure fluid content of 9%, and then the impregnated TPE roll was subjected to a quick freezing and gas-locking treatment with liquid nitrogen in a cooling chamber at −60° C. and then to low-temperature storage at −20° C. for 1 h, where 1 h after the low-temperature storage, a content of the high-pressure fluid in the impregnated TPE roll was 8.2%, and a mass loss rate of the high-pressure fluid was 8.9%.
(3) An impregnated TPE roll obtained after the low-temperature storage was heated in a heating medium for physical foaming, and a foamed material was rolled, cooled, and wound to obtain the TPE physically-foamed roll.

Figure 1:
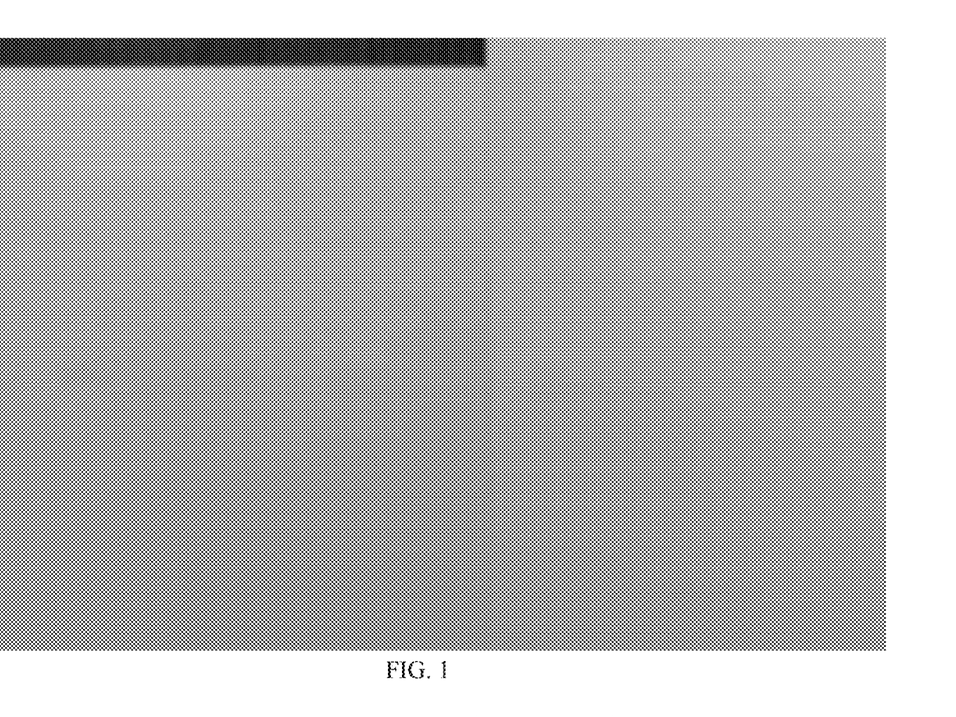
FIG. 1 is an optical picture of the TPE physically-foamed roll of the present disclosure.
Figure 2:
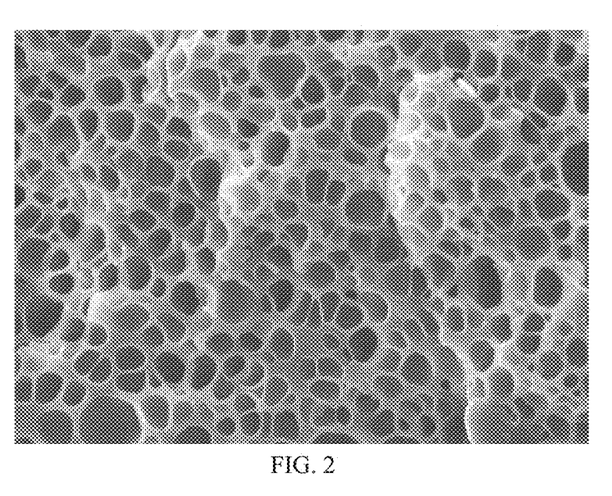
FIG. 2 is a cross-sectional scanning electron microscopy (SEM) image of the TPE physically-foamed roll of the present disclosure.

As shown in FIG. 1, the prepared TPE physically-foamed roll has a smooth surface, a thickness of 0.5 mm, a length of 60 μm, a density of 0.2 g/cm³, and uniform foam cells; and as shown in FIG. 2, a core layer of the TPE physically-foamed roll has an average foam cell size of about 25.8 μm and a Shore hardness of 30 C.

Example 2

An example of the semi-continuous preparation method of a TPE physically-foamed roll of the present disclosure was provided, including the following steps:
(1) 100 parts of a TPU particle (Shore hardness: 80 A), 10 parts of an EVA particle, and 0.5 part of an antioxidant were dried separately, premixed, and then subjected to continuous extrusion with a twin-screw extruder, calendering, and winding to obtain a precursor TPE roll with a thickness of 0.3 mm.
(2) The precursor TPE roll obtained in step (1) was placed in a high-pressure vessel filled with a $CO_2$ fluid for impregnation to obtain an impregnated TPE roll with a high-pressure fluid content of 9%, and then the impregnated TPE roll was subjected to a quick freezing and gas-locking treatment with liquid nitrogen in a cooling chamber at −60° C. and then to low-temperature storage at −20° C. for 6 h, where 6 h after the low-temperature storage, a content of the high-pressure fluid in the impregnated TPE roll was 7.8%, and a mass loss rate of the high-pressure fluid was 13.3%.
(3) An impregnated TPE roll obtained after the low-temperature storage was heated in a heating medium for physical foaming, and a foamed material was rolled, cooled, and wound to obtain the TPE physically-foamed roll.

The prepared TPE physically-foamed roll has a smooth surface, a thickness of 1.5 mm, a length of 58 μm, a density of 0.3 g/cm³, and uniform foam cells; and a core layer of the TPE physically-foamed roll has an average foam cell size of about 30.4 μm and a Shore hardness of 38 C.

Example 3

An example of the semi-continuous preparation method of a TPE physically-foamed roll of the present disclosure was provided, including the following steps:
(1) 100 parts of a TPEE particle (Shore hardness: 85 A) and 0.5 part of an antioxidant were dried separately, premixed, and then subjected to continuous extrusion with a twin-screw extruder, calendering, and winding to obtain a precursor TPE roll with a thickness of 0.5 mm.
(2) The precursor TPE roll obtained in step (1) was placed in a high-pressure vessel filled with a $CO_2$ fluid for impregnation to obtain an impregnated TPE roll with a high-pressure fluid content of 8.5%, and then the impregnated TPE roll was subjected to a quick freezing and gas-locking treatment with liquid nitrogen in a cooling chamber at −60° C. and then to low-temperature storage at −20° C. for 24 h, where 24 h after the low-temperature storage, a content of the high-pressure fluid in the impregnated TPE roll was 6.5%, and a mass loss rate of the high-pressure fluid was 23.5%.
(3) An impregnated TPE roll obtained after the low-temperature storage was heated in a heating medium for physical foaming, and a foamed material was rolled, cooled, and wound to obtain the TPE physically-foamed roll.

The prepared TPE physically-foamed roll has a smooth surface, a thickness of 0.9 mm, a length of 52 μm, a density of 0.3 g/cm³, and uniform foam cells; and a core layer of the TPE physically-foamed roll has an average foam cell size of about 21.4 μm and a Shore hardness of 40 C.

Example 4

An example of the semi-continuous preparation method of a TPE physically-foamed roll of the present disclosure was provided, including the following steps:

(1) 100 parts of a TPU particle (Shore hardness: 80 A), 5 parts of a talcum powder, and 0.5 part of an antioxidant were dried separately, premixed, and then subjected to continuous extrusion with a twin-screw extruder, calendering, and winding to obtain a precursor TPE roll with a thickness of 1 mm.

(2) The precursor TPE roll obtained in step (1) was placed in a high-pressure vessel filled with a $N_2$ fluid for impregnation to obtain an impregnated TPE roll with a high-pressure fluid content of 4%, and then the impregnated TPE roll was subjected to a quick freezing and gas-locking treatment with liquid nitrogen in a cooling chamber at −60° C. and then to low-temperature storage at −20° C. for 6 h, where 6 h after the low-temperature storage, a content of the high-pressure fluid in the impregnated TPE roll was 3.8%, and a mass loss rate of the high-pressure fluid was 5%.

(3) An impregnated TPE roll obtained after the low-temperature storage was heated in a heating medium for physical foaming, and a foamed material was rolled, cooled, and wound to obtain the TPE physically-foamed roll.

The prepared TPE physically-foamed roll has a smooth surface, a thickness of 1.5 mm, a length of 85 μm, a density of 0.1 g/cm³, and uniform foam cells; and a core layer of the TPE physically-foamed roll has an average foam cell size of about 15.5 μm and a Shore hardness of 24 C. It can be seen from comparison with the preparation method and product density in Example 2 that, compared with the impregnation of $CO_2$, a desorption rate of $N_2$ in a TPE core impregnated with $N_2$ is reduced; after the subsequent quick freezing and gas-locking treatment and low-temperature storage, the mass loss rate is reduced; and the density of the product is reduced.

Example 5

An example of the semi-continuous preparation method of a TPE physically-foamed roll of the present disclosure was provided, including the following steps:

(1) 100 parts of a TPU particle (Shore hardness: 80 A), 10 parts of PVA, and 0.5 part of an antioxidant were dried separately, premixed, and then subjected to continuous extrusion with a twin-screw extruder, calendering, and winding to obtain a precursor TPE roll with a thickness of 0.3 mm.

(2) The precursor TPE roll obtained in step (1) was placed in a high-pressure vessel filled with a $CO_2$ fluid for impregnation to obtain an impregnated TPE roll with a high-pressure fluid content of 9%, and then the impregnated TPE roll was subjected to a quick freezing and gas-locking treatment with liquid nitrogen in a cooling chamber at −60° C. and then to low-temperature storage at −20° C. for 6 h, where 6 h after the low-temperature storage, a content of the high-pressure fluid in the impregnated TPE roll was 8.5%, and a mass loss rate of the high-pressure fluid was 5.6%.

(3) An impregnated TPE roll obtained after the low-temperature storage was heated in a heating medium for physical foaming, and a foamed material was rolled, cooled, and wound to obtain the TPE physically-foamed roll.

The prepared TPE physically-foamed roll has a smooth surface, a thickness of 1.5 mm, a length of 85 m, a density of 0.1 g/cm³, and uniform foam cells; and a core layer of the TPE physically-foamed roll has an average foam cell size of about 15.5 μm and a Shore hardness of 26 C. It can be seen from comparison with the preparation method and product density in Example 2 that the use of PVA as a gas-phase blocking agent can further reduce a desorption rate of the high-pressure fluid in the impregnated roll; after the subsequent quick freezing and gas-locking treatment and low-temperature storage, the mass loss rate is reduced; and the density of the product is reduced.

Example 6

An example of the semi-continuous preparation method of a TPE physically-foamed roll of the present disclosure was provided, including the following steps:

(1) 100 parts of a TPU particle (Shore hardness: 80 A), 10 parts of an EVA particle, and 0.5 part of an antioxidant were dried separately, premixed, and then subjected to continuous extrusion with a twin-screw extruder and calendering; and a resulting material was coated with a PVA-containing aqueous solution (a mass content of PVA in the PVA-containing aqueous solution was 18%, and a resulting PVA coating layer had a thickness of 0.03 mm), then dried, and wound to obtain a precursor TPE roll with a thickness of 0.3 mm.

(2) The precursor TPE roll obtained in step (1) was placed in a high-pressure vessel filled with a $CO_2$ fluid for impregnation to obtain an impregnated TPE roll with a high-pressure fluid content of 9%, and then the impregnated TPE roll was subjected to a quick freezing and gas-locking treatment with liquid nitrogen in a cooling chamber at −60° C. and then to low-temperature storage at −20° C. for 6 h, where 6 h after the low-temperature storage, a content of the high-pressure fluid in the impregnated TPE roll was 8.7%, and a mass loss rate of the high-pressure fluid was 3.3%.

(3) An impregnated TPE roll obtained after the low-temperature storage was heated in a heating medium for physical foaming, and a foamed material was rolled, cooled, and wound to obtain the TPE physically-foamed roll.

The prepared TPE physically-foamed roll has a smooth surface, a thickness of 1.5 mm, a length of 85 μm, a density of 0.1 g/cm³, and uniform foam cells; and a core layer of the TPE physically-foamed roll has an average foam cell size of about 35.2 μm and a Shore hardness of 23 C. It can be seen from comparison with the preparation method and product density in Example 2 that the modification with the PVA coating layer can further reduce a desorption rate of the high-pressure fluid in the impregnated roll; after the subsequent quick freezing and gas-locking treatment and low-temperature storage, the mass loss rate is reduced; and the density of the product is reduced.

Example 7

An example of the semi-continuous preparation method of a TPE physically-foamed roll of the present disclosure was provided, including the following steps:

(1) 100 parts of a TPU particle (Shore hardness: 80 A), 5 parts of a talcum powder, and 0.5 part of an antioxidant were dried separately, premixed, and then subjected to continuous extrusion with a twin-screw extruder, calendering, and winding to obtain a precursor TPE roll with a thickness of 1 mm.

(2) The precursor TPE roll obtained in step (1) was placed in a high-pressure vessel filled with a $CO_2$ fluid for impregnation to obtain an impregnated TPE roll with a high-pressure fluid content of 9%, and then the impregnated TPE roll was subjected to a quick freezing and gas-locking treatment with carbon dioxide ice in a cooling chamber at −20° C. and then to low-temperature storage at −20° C. for 1 h, where 1 h after the low-temperature storage, a content of the high-pressure fluid in the impregnated TPE roll was 8.5%, and a mass loss rate of the high-pressure fluid was 5.6%.

(3) An impregnated TPE roll obtained after the low-temperature storage was heated in a heating medium for physical foaming, and a foamed material was rolled, cooled, and wound to obtain the TPE physically-foamed roll.

The prepared TPE physically-foamed roll has a smooth surface, a thickness of 2 mm, a length of 92 μm, a density of 0.08 g/cm$^3$, and uniform foam cells; and a core layer of the TPE physically-foamed roll has an average foam cell size of about 68.5 μm and a Shore hardness of 21 C.

Example 8

An example of the semi-continuous preparation method of a TPE physically-foamed roll of the present disclosure was provided, including the following steps:
(1) 100 parts of a TPU particle (Shore hardness: 80 A), 5 parts of a talcum powder, and 0.5 part of an antioxidant were dried separately, premixed, and then subjected to continuous extrusion with a twin-screw extruder, calendering, and winding to obtain a precursor TPE roll with a thickness of 1 mm.
(2) The precursor TPE roll obtained in step (1) was placed in a high-pressure vessel filled with a $CO_2$ fluid for impregnation to obtain an impregnated TPE roll with a high-pressure fluid content of 9%, and then the impregnated TPE roll was subjected to a quick freezing and gas-locking treatment with liquid nitrogen in a cooling chamber at −100° C. and then to low-temperature storage at −20° C. for 1 h, where 1 h after the low-temperature storage, a content of the high-pressure fluid in the impregnated TPE roll was 8.8%, and a mass loss rate of the high-pressure fluid was 2.2%.
(3) An impregnated TPE roll obtained after the low-temperature storage was heated in a heating medium for physical foaming, and a foamed material was rolled, cooled, and wound to obtain the TPE physically-foamed roll.

The prepared TPE physically-foamed roll has a smooth surface, a thickness of 2.2 mm, a length of 95 μm, a density of 0.075 g/cm$^3$, and uniform foam cells; and a core layer of the TPE physically-foamed roll has an average foam cell size of about 72.6 μm and a Shore hardness of 20 C.

Example 9

An example of the semi-continuous preparation method of a TPE physically-foamed roll of the present disclosure was provided, including the following steps:
(1) 100 parts of a TPU particle (Shore hardness: 95 A), 5 parts of a talcum powder, and 0.5 part of an antioxidant were dried separately, premixed, and then subjected to continuous extrusion with a twin-screw extruder, calendering, and winding to obtain a precursor TPE roll with a thickness of 1 mm.
(2) The precursor TPE roll obtained in step (1) was placed in a high-pressure vessel filled with a $CO_2$ fluid for impregnation to obtain an impregnated TPE roll with a high-pressure fluid content of 9%, and then the impregnated TPE roll was subjected to a quick freezing and gas-locking treatment with liquid nitrogen in a cooling chamber at −60° C. and then to low-temperature storage at −20° C. for 1 h, where 1 h after the low-temperature storage, a content of the high-pressure fluid in the impregnated TPE roll was 6.7%, and a mass loss rate of the high-pressure fluid was 4.3%.
(3) An impregnated TPE roll obtained after the low-temperature storage was heated in a heating medium for physical foaming, and a foamed material was rolled, cooled, and wound to obtain the TPE physically-foamed roll.

The prepared TPE physically-foamed roll has a smooth surface, a thickness of 1.4 mm, a length of 56 μm, a density of 0.38 g/cm$^3$, and uniform foam cells; and a core layer of the TPE physically-foamed roll has an average foam cell size of about 26.8 μm and a Shore hardness of 45 C.

Comparative Example 1

A preparation method of a TPE physically-foamed roll was provided, including the following steps:
(1) 100 parts of a TPU particle (Shore hardness: 80 A), 5 parts of a talcum powder, and 0.5 part of an antioxidant were dried separately, premixed, and then subjected to continuous extrusion with a twin-screw extruder, calendering, and winding to obtain a precursor TPE roll with a thickness of 1 mm.
(2) The precursor TPE roll obtained in step (1) was placed in a high-pressure vessel filled with a $CO_2$ fluid for impregnation to obtain an impregnated TPE roll with a high-pressure fluid content of 9%, and then the impregnated TPE roll was placed at normal temperature and pressure for 10 min.
(3) An impregnated TPE roll obtained after the placement at normal temperature and pressure was heated in a heating medium for physical foaming.

Final results show that the roll cannot be uniformly foamed; and after the impregnated TPE roll is placed for 1 h at normal temperature and pressure, a content of the high-pressure fluid in the impregnated TPE roll is only 3.5%, a mass loss rate of the high-pressure fluid is 61.1%, and the remaining high-pressure fluid is not enough to drive uniform physical foaming. It can be seen from comparison of the product obtained in this comparative example with the product obtained in Example 2 that the impregnated roll without undergoing the quick freezing and gas-locking treatment and low-temperature storage cannot confine the high-pressure fluid, and the high-pressure fluid will quickly escape from the TPU matrix, making it difficult to foam the product.

Comparative Example 2

A preparation method of a TPE physically-foamed roll was provided, including the following steps:
(1) 100 parts of a TPU particle (Shore hardness: 80 A), 10 parts of PVA, and 0.5 part of an antioxidant were dried separately, premixed, and then subjected to continuous extrusion with a twin-screw extruder, calendering, and winding to obtain a precursor TPE roll with a thickness of 1 mm.
(2) The precursor TPE roll obtained in step (1) was placed in a high-pressure vessel filled with a $CO_2$ fluid for impregnation to obtain an impregnated TPE roll with a high-pressure fluid content of 9%, and then the impregnated TPE roll was placed at normal temperature and pressure for 10 min.

(3) An impregnated TPE roll obtained after the placement at normal temperature and pressure was heated in a heating medium for physical foaming.

Final results show that the roll cannot be uniformly foamed; and an obvious non-foamed region appears in the roll after the first 10 μm roll. It can be seen from comparison between products obtained in Examples 2 and 5 that the impregnated roll without undergoing the quick freezing and gas-locking treatment and low-temperature storage cannot confine the high-pressure fluid, and even if PVA is used to reduce a desorption rate of the high-pressure fluid, a final effect is still poor, and the high-pressure fluid will still escape from the TPU matrix, making it difficult to stably foam the product.

Comparative Example 3

A preparation method of a TPE physically-foamed roll was provided, including the following steps:
(1) 100 parts of a TPU particle (Shore hardness: 80 A), 10 parts of an EVA particle, and 0.5 part of an antioxidant were dried separately, premixed, and then subjected to continuous extrusion with a twin-screw extruder and calendering; and a resulting material was coated with a PVA-containing aqueous solution (a mass content of PVA in the PVA-containing aqueous solution was 18%, and a resulting PVA coating layer had a thickness of 0.03 mm), then dried, and wound to obtain a precursor TPE roll with a thickness of 0.3 mm.
(2) The precursor TPE roll obtained in step (1) was placed in a high-pressure vessel filled with a $CO_2$ fluid for impregnation to obtain an impregnated TPE roll with a high-pressure fluid content of 9%, and then the impregnated TPE roll was placed at normal temperature and pressure for 10 min.
(3) An impregnated TPE roll obtained after the placement at normal temperature and pressure was heated in a heating medium for physical foaming.

Final results show that the roll can undergo uniform foaming expansion; the roll after the first 10 μm roll undergoes non-uniform foaming expansion; and an obvious non-foamed region appears in the roll after the first 20 μm roll. It can be seen from comparison between products obtained in Examples 2 and 6 that the impregnated roll without undergoing the quick freezing and gas-locking treatment and low-temperature storage cannot confine the high-pressure fluid, and even if a PVA coating layer is used to reduce a desorption rate of the high-pressure fluid, a final effect is still poor, and the high-pressure fluid will still escape from the TPU matrix, making it difficult to stably foam the product.

Comparative Example 4

A preparation method of a TPE physically-foamed roll was provided, including the following steps:
(1) 100 parts of a TPU particle (Shore hardness: 80 A), 10 parts of an EVA particle, and 0.5 part of an antioxidant were dried separately, premixed, and then subjected to continuous extrusion with a twin-screw extruder, calendering, and winding to obtain a precursor TPE roll with a thickness of 0.3 mm.
(2) The precursor TPE roll obtained in step (1) was placed in a high-pressure vessel filled with a $CO_2$ fluid for impregnation to obtain an impregnated TPE roll with a high-pressure fluid content of 9%, and then the impregnated TPE roll was subjected to a quick freezing and gas-locking treatment with liquid nitrogen in a cooling chamber at −10° C. and then to low-temperature storage at −20° C. for 6 h, where 6 h after the low-temperature storage, a content of the high-pressure fluid in the impregnated TPE roll was 6%, and a mass loss rate of the high-pressure fluid was 33.3%.
(3) An impregnated TPE roll obtained after the low-temperature storage was heated in a heating medium for physical foaming, and a foamed material was rolled, cooled, and wound to obtain the TPE physically-foamed roll.

Compared with the product obtained in Example 2, the prepared TPE physically-foamed roll has a smooth surface, a thickness of 1.3 mm, a length of 52 μm, and a density of 0.6 g/cm$^3$ increased from 0.3 g/cm$^3$; and a core layer of the TPE physically-foamed roll has an average foam cell size of about 85.6 μm and a Shore hardness of 45 C.

Finally, it should be noted that the above examples are provided merely to describe the technical solutions of the present disclosure, rather than to limit the protection scope of the present disclosure. Although the present disclosure is described in detail with reference to preferred examples, a person of ordinary skill in the art should understand that modifications or equivalent replacements may be made to the technical solutions of the present disclosure without departing from the spirit and scope of the technical solutions of the present disclosure.

The invention claimed is:
1. A semi-continuous preparation method of a thermoplastic elastomer (TPE) physically-foamed roll, comprising the following steps:
(1) sequentially drying and premixing a TPE and additives, and subjecting a resulting mixture to continuous extrusion with a twin-screw extruder, calendering, and winding to obtain a precursor TPE roll;
(2) impregnating the precursor TPE roll obtained in step (1) in a high-pressure fluid to obtain an impregnated TPE roll, and subjecting the impregnating TPE roll to a quick freezing and gas-locking treatment and low-temperature storage, wherein a mass content of the high-pressure fluid in the impregnated TPE roll is 1% to 15%; the quick freezing and gas-locking treatment is conducted at −20° C. to −100° C.; the low-temperature storage is conducted at −60° C. to −20° C.; and the high-pressure fluid for the impregnating comprises at least one selected from the group consisting of a $CO_2$ fluid and a $N_2$ fluid; and
(3) heating an impregnated TPE roll obtained after the low-temperature storage in a heating medium for physical foaming, and roll pressing, cooling, and winding a foamed material to obtain the TPE physically-foamed roll, wherein the heating medium is hot air or hot water;
wherein in step (1), the precursor TPE roll further comprises a gas blocking layer, and a preparation method of the precursor TPE roll comprises: sequentially drying and premixing the TPE and the additives, and subjecting a resulting mixture to continuous extrusion with a twin-screw extruder and calendering; and coating a surface of the elastomer with a PVA-containing aqueous solution, and drying and winding a resulting material to obtain the precursor TPE roll;
the gas blocking layer has a thickness of 0.01 mm to 0.05 mm; and a mass content of PVA in the PVA-containing aqueous solution is 5% to 30%;
in step (2), the high-pressure fluid for the impregnation has a pressure of 1 MPa to 7 MPa, and the impregnation is conducted for 1 h to 24 h.

2. The semi-continuous preparation method of a TPE physically-foamed roll according to claim 1, wherein in step (1), the TPE has a Shore hardness of 60 A to 95 A, and the precursor TPE roll has a thickness of 0.1 mm to 3 mm.

3. The semi-continuous preparation method of a TPE physically-foamed roll according to claim 1, wherein in step (1), the TPE comprises at least one selected from the group consisting of thermoplastic polyurethane (TPU), thermoplastic polyester elastomer (TPEE), and thermoplastic polyamide elastomer (TPAE); and the additives comprise a nucleating agent and an antioxidant.

4. The semi-continuous preparation method of a TPE physically-foamed roll according to claim 1, wherein in step (1), the additives further comprise 1 to 20 parts of a gas blocking agent; and the gas blocking agent comprises polyvinyl alcohol (PVA).

5. The semi-continuous preparation method of a TPE physically-foamed roll according to claim 1, wherein in step (2), the mass content of the high-pressure fluid in the impregnated TPE roll obtained after the impregnating is 2% to 10%.

6. The semi-continuous preparation method of a TPE physically-foamed roll according to claim 1, wherein in step (2), the quick freezing and gas-locking treatment is conducted at −50° C. to −80° C.

* * * * *